United States Patent [19]

Hasegawa et al.

[11] Patent Number: 5,141,983

[45] Date of Patent: Aug. 25, 1992

[54] AQUEOUS COATING COMPOSITION

[75] Inventors: Yoshiki Hasegawa, Osaka; Fumio Yoshino; Shinichi Yoshioka, both of Izumi-ohtsu; Kiyoshi Ohnishi, Sakai, all of Japan

[73] Assignee: Dainippon Ink & Chemicals, Inc., Tokyo, Japan

[21] Appl. No.: 808,977

[22] Filed: Dec. 17, 1991

Related U.S. Application Data

[63] Continuation of Ser. No. 356,461, May 25, 1989, abandoned.

[30] Foreign Application Priority Data

May 30, 1988 [JP] Japan .................. 63-130178
May 30, 1988 [JP] Japan .................. 63-130179

[51] Int. Cl.$^5$ .......................... C08J 3/03; C08L 75/04
[52] U.S. Cl. ............................................. 524/457
[58] Field of Search ........................................ 524/457

[56] References Cited

U.S. PATENT DOCUMENTS

| | | | |
|---|---|---|---|
| 4,318,833 | 3/1982 | Guagliardo | 524/457 |
| 4,730,021 | 3/1988 | Zom et al. | 524/457 |
| 4,888,383 | 12/1989 | Haybrechts | 524/457 |
| 4,918,129 | 4/1990 | Probst et al. | 524/457 |
| 4,927,876 | 5/1990 | Loogan et al. | 524/457 |
| 4,948,829 | 8/1990 | Mitsuji et al. | 524/457 |
| 5,011,881 | 4/1991 | Fujii et al. | 524/457 |

FOREIGN PATENT DOCUMENTS 0189945 6/1986 European Pat. Off. .
3316550 8/1984 Fed. Rep. of Germany .

*Primary Examiner*—Morton Foelak
*Assistant Examiner*—Rabon Sergent
*Attorney, Agent, or Firm*—Sherman and Shalloway

[57] ABSTRACT

An aqueous coating composition comprising, as essential components, an aqueous polyurethane resin (A) obtained by reacting a diisocyanate and glycols containing a carboxylic acid group-containing glycol to prepare an urethane prepolymer, neutralizing the urethane prepolymer and subjecting the neutralized urethane prepolymer to chain extension with a hydrazine derivative, and an aqueous dispersion (B) of an acrylic copolymer whose constituent monomers contain carbonyl group-containing monomer or an amido group-containing monomer in an amount of at least 0.5 part by weight per 100 parts by weight of total polymerizable monomers, wherein the weight ratio in terms of solid content, of the aqueous polyurethane resin (A) and the aqueous dispersion (B) of an acrylic copolymer is 100/5 to 5/100, and an aqueous coating composition obtained by, in the presence of the above aqueous polyurethane resin (A), polymerizing radical-polymerizable acrylic monomers (C) containing a carbonyl group-containing monomer or an amido group-containing monomer in an amount of at least 0.5 part by weight per 100 parts by weight of total polymerizable monomers, in such proportions that the weight ratio in terms of solid content, of the aqueous polyurethane resin (A) and the radical-polymerizable acrylic monomers (C) is 100/5 to 5/100.

10 Claims, No Drawings

AQUEOUS COATING COMPOSITION

This application is a continuation of application Ser. No. 07/356,461, filed May 25, 1989, now abandoned.

The present invention relates to a novel and useful aqueous coating composition. More particularly, the present invention relates to an aqueous coating composition comprising an aqueous polyurethane resin and an aqueous dispersion of an acrylic copolymer, and an aqueous coating composition obtained by polymerizing radical-polymerizable acrylic monomers in the presence of an aqueous polyurethane resin. These are novel compositions having all of the elasticity and abrasion resistance inherently possessed by urethane resins and the weather resistance and toughness inherently possessed by acrylic resins and can find wide applications as a coating for cement, concrete, metals, paper, leather, wood, etc.

Aqueous dipsersions of acrylic copolymers as an aqueous coating composition have conventionally been used, for their excellency in weather resistance and toughness, in various applications such as interior or exterior finish work of buildings, coating of leather, metal, wood floor, etc., impregnation or bonding of fibers, adhesion, pasting and the like.

The requirements for the capability of coating compositions have increased in recent years with the trend to higher quality, the diversification of material to be coated and the development of new applications. In this connection, there are required, in an increasing number of applications, those coating compositions having, in addition to the weather resistance possessed by the conventional coating compositions, elasticity, abrasion resistance, etc. (when made into a film) comparable to those of urethane resins. In order to obtain aqueous coating compositions having such properties, various monomers containing an acrylic functional group have been studied to improve the conventional aqueous dispersions of acrylic copolymers. However, it has been difficult to obtain an acrylic resin giving an elasticity comparable to that of urethane resins. Therefore, an improvement on this has been desired.

Meanwhile, aqueous polyurethane resins as an aqueous coating composition have conventionally been used, for their excellency in elasticity and abrasion resistance, for the coating of fabric, paper, leather, plastic, wooden floor, etc. However, when they are applied by drying at normal temperature, the resulting coating film is insufficient in water resistance, alkali resistance and weather resistance owing to the watersoluble substance used to impart water solubility. When they are a urethane dispersion, the film formability between particles is insufficient owing to the strong intra-particle cohesive force. Therefore, their use has been substantially restricted to indoor applications. Incidentally, conventional aqueous polyurethane resins have been applied in most cases by heat-drying at high temperatures ordinarily using a crosslinking agent, and the elasticity inherent to urethane resins has been expressed only by such application.

In order to develop an aqueous coating composition having all of the elasticity and abrasion resistance possessed by urethane resins and the weather resistance and toughness possessed by acrylic resins, it was studied to mix an aqueous polyurethane resin with an aqueous dispersion of an acrylic copolymer. In many cases, however, mere mixing of them gives an aqueous coating composition having the drawbacks of respective resins, i.e. both of the poor elasticity of the aqueous dispersion of an acrylic copolymer and the poor weather resistance of the aqueous polyurethane resin. Thus, it has been desired to develop a resin having all of the advantageous properties of the two resins.

Therefore, the object of the present invention lies in the development of an aqueous coating composition having all of the elasticity and abrasion resistance possessed by urethane resins and the weather resistance and toughness possessed by acrylic resins.

As a result of extensive research, the present inventors found that in order to achieve the above object, it is necessary to functionally bond (not merely mix) an aqueous polyurethane resin and an aqueous dispersion of an acrylic copolymer.

According to the present invention, there are provided an aqueous coating composition comprising, as essential components, an aqueous polyurethane resin (A) obtained by reacting a diisocynate and glycols containing a carboxylic acid group-containing glycol to prepare a urethane prepolymer, neutralizing the urethane prepolymer and subjecting the neutralized urethane prepolymer to chain extension with a hydrazine derivative, and an aqueous dispersion (B) of an acrylic copolymer whose constituent monomers contain a carbonyl group-containing monomer or an amido group-containing monomer in an amount of at least 0.5 part by weight per 100 parts by weight of total polymerizable monomers, wherein the weight ratio in terms of solid content, of the aqueous polyurethane resin (A) and the aqueous dispersion (B) of an acrylic copolymer is 100/5 to 5/100, and an aqueous coating composition obtained by, in the presence of the above aqueous polyurethane resin (A), polymerizing radical-polymerizable acrylic monomers (C) containing a carbonyl group-containing monomer or an amido group-containing monomer in an amount of at least 0.5 part by weight per 100 parts by weight of total polymerizable monomers, in such proportions that the weight ratio in terms of solid content, of the aqueous polyurethane resin (A) and the radical-polymerizable acrylic monomers (C) is 100/5 to 5/100.

The aqueous polyurethane resin (A) used in the present invention can be produced, for example, by subjecting a diisocyanate, a glycol and a carboxylic acid group-containing glycol to a urethane-forming reaction to prepare a urethane prepolymer, subjecting the urethane prepolymer to neutralization and chain extension and adding distilled water to the resulting product. The organic solvent used in the reaction may be removed as necessary by a known method.

As the diisocyanate used in the preparation of the urethane prepolymer, there are alicyclic or aromatic diisocyanates. Specific examples of these diisocyanates include 2,4-tolylene diisocyanate, 2,6-tolylene diisocyanate, 4,4'-diphenylmethane diisocyanate, m-phenylene diisocyanate, xylylene diisocyanate, tetra-methylene diisocyanate, lysine diisocyanate, 1,4-cyclohexylene diisocyanate, 4,4'-dicyclohexylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, isophorone diisocyanate, etc.

As the glycol used in the preparation of the urethane prepolymer, there can be mentioned a low-molecular glycol, a high-molecular glycol, a polyester polyol, a polycarbonate polyol, etc. They can be used alone, or, in the form of a mixture of a low-molecular glycol with a high-molecular glycol or a polyester polyol as well known in the urethane technique.

As the low-molecular glycol, there can be mentioned ethylene glycol, diethylene glycol, triethylene glycol, 1,2-propylene glycol, 1,3-butylene glycol, tetramethylene glycol, hexamethylene glycol, decamethylene glycol, octanediol, tricyclodecanedimethylol, hydrogenated bisphenol A, cyclohexanedimethanol, etc. These can be used in admixture of two or more.

Examples of the high-molecular glycol includes methylene glycol, etc.

The polyester polyol can be any compound obtained by reacting a glycol component and a dicarboxylic acid component and can be easily produced by a known process. The polyester polyol can be obtained not only by an esterification reaction but also by an ester exchange reaction. That is, the polyester polyol can be produced also by an ester exchange reaction using a glycol and a lower alkyl ester of a dicarboxylic acid.

When the polyester polyol used in the present invention is obtained by reacting a glycol component and an unsaturated dicarboxylic acid component, the resulting aqueous polyurethane resin forms a stronger functional bond with radical-polymerizable acrylic monomers to give a more desirable aqueous coating composition.

As the unsaturated dicarboxylic acid, there can be mentioned, for example, itaconic acid, maleic acid, phthalic acid, etc. There can be mentioned, as other dicarboxylic acids, for example, isophthalic acid, terephthalic acid, succinic acid, adipic acid, malonic acid, sebacic acid, azelaic acid, etc. There can also be mentioned lower alkyl esters of these dicarboxylic acids. All these dicarboxylic acids can be used alone or in combination.

As the carboxylic acid group-containing glycol, there can be mentioned 2,2-dimethylolpropionic acid, 2,2-dimethylol-butyric acid, 2,2-dimethylolvaleric acid, etc.

The reaction between diisocyanate and glycols is preferably effected in an organic solvent which is inert to isocyanato group and has a high affinity to water, such as dioxane, acetone, methyl ethyl ketone, N-methylpyrrolidone, tetrahydrofuran or the like.

As the neutralizing agent for the urethane prepolymer, there can be mentioned amines such as trimethylamine, triethylamine, tri-n-propylamine, tributylamine, triethanolamine and the like; sodium hydroxide; potassium hydroxide; ammonia; and so forth.

As the chain extender used in the present invention, a hydrazine derivative is required. As the hydrazine derivative, there can be mentioned hydrazine, ethylene-1,2-dihydrazine, propylene-1,3-dihydrazine, butylene-1,4-dihydrazine, etc.

As the chain extender for urethane prepolymer, there are ordinarily known polyols such as ethylene glycol, propylene glycol and the like; aliphatic, alicyclic or aromatic diamines such as ethylenediamine, propylenediamine, hexamethylenediamine, tolylenediamine, xylylenediamine, diphenyldiamine, diaminodiphenylmethane, diaminocyclohexylmethane, piperazine, 2-methylpiperazine, isophoronediamine and the like; and so forth. These compounds, however, cannot be used in the present invention because the urethane resin produced therewith does not effectively form a functional bond with an acrylic resin formed by emulsion polymerization of radical polymerizable acylic monomers.

That is, the aqueous polyurethane resin obtained by the chain extension of urethane prepolymer is required to have a chemical structure —NHNH$_2$ at the terminal of the polymer molecule, and only when said resin has that chemical structure, the resin can functionally bond with the carbonyl group-containing monomer or the amido group-containing monomer contained in the radical-polymerizable acrylic monomers.

In the present invention, the acid value of the aqueous polyurethane resin is preferably 10-200 per resin solid content. When the acid value is less than 10, there tend to appear agglomerates when the urethane prepolymer formed in an organic solvent is made into an aqueous product using a neutralizing agent, a chain extender and distilled water, and the resulting aqueous polyurethane resin may have poor storage stability. When the acid value is more than 200, a functional bond between aqueous polyurethane resin and acrylic resin is obtained but the resulting aqueous coating composition has no desired properties in durability, water resistance, etc. in some cases.

The radical-polymerizable acrylic monomers used to obtain an aqueous coating composition of the present invention are required to contain a carbonyl groupcontaining monomer or an amido group-containing monomer in an amount of at least 0.5 part by weight per 100 parts by weight of total radical-polymerizable acrylic monomers. The surfactant, protective colloid and polymerization initiator used in effecting emulsion polymerization can be those known conventionally.

The carbonyl group-containing monomer refers to a monomer containing aldo group or keto group and does not include compounds containing only ester bond

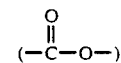

or carboxyl group

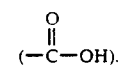

As examples of the carbonyl group containing monomer, there can be mentioned acrolein, diacetone acrylamide, vinyl methyl ketone, vinyl ethyl ketone, vinyl butyl ketone, diacetone acrylate, acetonitrile acrylate, etc.

As the amido group-containing monomer, there can be mentioned monoolefinically unsaturated carboxylic acid amides, N-alkyl derivatives of monoolefinically unsaturated carboxylic acid amides and N-alkylol derivatives of monoolefinically unsaturated carboxylic acid amides. Examples of these monomers include acrylamide, methacrylamide, itaconic acid amide, maleamide, N-methylacrylamide, N-isobutylacrylamide, N-methylmethacrylamide, N-methylolacrylamide, N-methylolmethacrylamide, N-ethoxymethylacrylamide, N-n-butoxymethylacrylamide, N-iso-propoxymethacrylamide, etc.

These carbonyl group-containing or amido group-containing monomers can be used alone or in combination but are required in an amount of at least 0.5 part by weight, preferably 1.0-10.0 parts by weight per 100 parts by weight of total polymerizable monomers. When the amount is less than 0.5 part by weight, there is seen no effect by functional bond between aqueous polyurethane resin and acrylic resin, and the resulting aqueous coating composition shows no striking improvement in properties such as weather resistance, water resistance, alkali resistance, elasticity, abrasion resistance and the like.

As the acrylic monomers other than those mentioned above, used in emulsion polymerization in the present invention, there can be mentioned acrylic acid esters such as methyl acrylate, ethyl acrylate, butyl acrylate, 2-ethylhexyl acrylate; methacrylic acid esters such as methyl methacrylate, ethyl methacrylate and the like; and so forth.

In the present invention, there can be also used other polymerizable unsaturated monomers copolymerizable with the above mentioned acrylic monomers.

As such polymerizable unsaturated monomers, there can be mentioned esters of maleic acid, fumaric acid and itaconic acid; vinyl esters such as vinyl acetate, vinyl propionate, vinyl tertiary carboxylate and the like; esters of aromatic vinyls such as styrene, vinyltoluene and the like; heterocyclic vinyl compounds such as vinylpyrrolidone and the like; vinyl chloride, acrylonitrile, vinyl ether, vinyl ketone, vinyl amide and the like; halogenated vinylidene compounds such as vinylidene chloride, vinylidene fluoride and the like;α-olefins such as ethylene, propylene and the like; and dienes such as butadiene and the like.

As polymerizable unsaturated monomers having a reactive polar group, there can be mentioned glycidyl compounds such as glycidyl acrylate, glycidyl methacrylate, allyl glycidyl ether and the like; silane compounds such as vinyltrichlorosilane, vinyltriethoxysilane, vinyltris($\beta$-methoxyethoxy)silane, gamma-methacryloxypropyltrimethoxysilane and the like; carboxyl compounds such as acrylic acid, methacrylic acid, maleic acid or its half ester, fumaric acid or its half ester, itaconic acid or its half ester, crotonic acid and the like; hydroxyl compounds such as $\beta$-hydroxyethyl acrylate, $\beta$-hydroxyethyl methacrylate and the like; and amine compounds such as alkylamino acrylates, alkylamino methacrylates and the like.

In the present invention, when the radicalpolymerizable acrylic monomers are emulsion-polymerized in the presence of the aqueous polyurethane resin, the aqueous polyurethane resin can become a place for the reaction of the radical-polymerizable monomers, and the use of surfactant (emulsifier) is not necessarily required. However, the surfactant (emulsifier) may be used in an amount of 0-10 parts by weight per 100 parts by weight of the radical-polymerizable acrylic monomers. The surfactant (emulsifier) can be those known conventionally.

The surfactant can be appropriately selected from, for example, anionic emulsifiers such as sodium dodecylbenzenesulfate, sodium dodecylbenzenesulfonate, salts of alkyl aryl polyether sulfuric acid and the like; nonionic emulsifiers such as polyoxyethylene lauryl ether, polyoxyethylene nonylphenyl ether, polyoxyethylenepolyoxypropylene block copolymer and the like; and cationic emulsifiers such as cetyltrimethylammonium bromide, laurylpyridinium chloride and the like. It is also possible to use a water-soluble oligomer as a dispersant in place of the emulsifier or in combination with the emulsifier. It is also effective to use a water-soluble polymer (e.g. polyvinyl alcohol, hydroxyethyl cellulose) in combination with the emulsifier, or to add said polymer to the emulsion after polymerization.

The total amount of the emulsifier, watersoluble oligomer and water-soluble polymer used is preferably 0-10 parts by weight per 100 parts by weight of the radical-polymerizable acrylic monomers. A total amount higher than this is not preferable because the resulting aqueous coating composition gives, in some cases, a coating film of significantly reduced water resistance.

As the radical polymerization initiator used in the emulsion polymerization effected to obtain the aqueous coating composition of the present invention, there can be used those employed in ordinary emulsion polymerization. Examples include potassium persulfate, ammonium persulfate, azobisisobutyronitrile, its hydrochloride, etc. There can also be used, as necessary, organic peroxides such as cumene hydroperoxide, tertbutyl hydroperoxide and the like. There can also be used known redox type initiators, i.e. combinations of (a) a persulfate or a peroxide as mentioned above, (b) a reducing agent such as sodium sulfoxylate formaldehyde, sodium pyrosulfite, L-ascorbic acid or the like and (c) metal ion such as iron ion.

The concentration in emulsion polymerization is preferably selected so that the final composition has a solid content of 25-65% by weight from the practical standpoint. The ethylenically unsaturated monomers and radical polymerization initiator can be added to the reaction system by a known addition method such as addition in one lump sum, continuous dropping, addition in portions or the like.

The emulsion poymerization is effected at a temperature range employed in known emulsion polymerization, at atmospheric pressure or, when ethylenically unsaturated monomers of gaseous state are used, under pressure.

In the present invention, radical-polymerizable acrylic monomers containing a carbonyl group-containing monomer or an amido group-containing monomer are emulsionpolymerized in the presence of an aqueous polyurethane resin subjected to chain extension with a hydrazine derivative, whereby a strong functional bond is expressed within each emulsion particle and between emulsion particles when these particles form a film.

This bond is thought to appear as a result of an organic reaction which takes place at the time of dehydration and film formation between the hydrazine group at the polymer molecule terminal of the aqueous polyurethane resin and the carbonyl or amido group of the acrylic polymer.

In the aqueous coating composition of the present invention, the function of a condensation type resin and the function of a radical polymerization resin are combined organically. Therefore, the aqueous coating composition not only has all of the elasticity and abrasion resistance possessed by urethane resins and the weather resistance and toughness possessed by acrylic resins but also has much higher solvent resistance, etc. than the respective resins do. For example, the coating film obtained with an aqueous polyurethane resin dissolves easily in ketones (e.g. methyl ethyl ketone), and the coating film obtained with an acrylic resin emulsion synthesized using no aqueous polyurethane resin dissolves easily in toluene, etc. However, the aqueous coating composition of the present invention is insoluble in any of methyl ethyl ketone and toluene.

Further, the aqueous coating composition of the present invention has a heat-softening temperature higher than those of the aqueous polyurethane resin and the aqueous dispersion of an acrylic copolymer both contained in the aqueous coating composition Said heat-softening temperature cannot be attained by mere mixing of said aqueous resin and said aqueous dispersion.

No functional bond as seen in the aqueous coating composition of the present invention is obtained in a mixture system between an aqueous polyurethane resin and an aqueous dispersion of an acrylic copolymer, not completely meeting the requirements of the present invention, and such a mixture system cannot have all of the elasticity and abrasion resistance possessed by urethane resins and the weather resistance possessed by acrylic resins. Moreover, this mixture system shows no synergistic effect in solvent resistance, either, and easily dissolves in both the solvents in which urethane resins dissolve and the solvents in which acrylic resins dissolve.

In the present invention, the compounding ratio of the aqueous polyurethane resin and the aqueous dispersion of an acrylic copolymer is required to be 100/5 to 5/100, preferably 100/10 to 10/100 in terms of solid content weight ratio. When the ratio deviates from this range, the resulting aqueous coating composition is difficult to have both the properties of the aqueous polyurethane resin and the properties of the aqueous dispersion of an acrylic copolymer, and accordingly it is hard to obtain a coating film having features as mentioned previously.

The compounding ratio of the aqueous polyurethane resin and the aqueous dispersion of an acrylic copolymer is appropriately selected within the above range so as to give an aqueous coating composition of desired properties. By doing so, the properties of urethane resin or acrylic resin can be emphasized in the aqueous coating composition.

Meanwhile, the compounding ratio of the aqueous polyurethane resin (A) and the radical-polymerizable acrylic monomers (C) is required in the present invention to be 100/5 to 5/100, preferably 100/10 to 10/100 in terms of solid content weight ratio When the ratio deviates from the above range, the resulting aqueous coating composition is difficult to have both the properties of polyurethane resin and the properties of acrylic resin, and accordingly it is hard to obtain a coating film having features as mentioned previously. By appropriately selecting the compounding ratio of the aqueous polyurethane resin and the radical-polymerizable acrylic monomers within the above range, the properties of urethane resin or acrylic resin can be emphasized in the aqueous coating composition.

The aqueous coating composition of the present invention can be produced in the same manner as in the production of an aqueous coating composition using, as a vehicle, a conventional type aqueous dispersion of an acrylic copolymer, by using, as a vehicle, a composition comprising an aqueous polyurethane (A) and an aqueous dispersion (B) of an acrylic copolymer or a composition which is an aqueous polyurethane resin-acrylic resin composite, obtained by polymerizing radical-polymerizable acrylic monomers (C) in the presence of an aqueous polyurethane resin (A). That is, said composition is combined with a pigment, a filler, an aggregate, a dispersant, a wetting agent, a thickener and/or a rheology-controlling agent, a defoamant, a plasticizer, a film formation aid, an organic solvent, an antiseptic, a fungicide, a pH-controlling agent, a rust preventive, etc. so as to meet an application purpose, and a coating is obtained according to an ordinary method.

The present invention is explained in more detail below by way of Examples. However, the present invention is in no way restricted to these Examples. In the followings, parts and % are always by weight.

PRODUCTION EXAMPLE 1

Production of aqueous polyurethane resin (A), 1,780 g of 1,6-hexanediol, 2,545 g of adipic acid and 567 g of 2,2-dimethylolpropionic acid were mixed, heated to 170° C, and reacted for 23 hours at that temperature to obtain a polyester polyol having a hydroxyl value of 60 and an acid value of 60.

The polyester polyol was diluted with 1,815 g of methyl ethyl ketone To 240 g of the resulting polyester polyol solution (I) were added 220 g of methyl ethyl ketone, 30 g of 2,2-dimethylolpropionic acid and 27 g of cyclohexanedimethanol, and they were stirred. To the mixture was added 236 g of 4,4'-dicyclohexylmethane diisocyanate. They were heated to 80° C., reacted for 6 hours, and cooled to 30° C. to obtain an urethane prepolymer solution.

The urethane prepolymer was slowly poured into an aqueous amine solution obtained by dissolving 21 g of an 80% aqueous hydrazine solution and 40 g of triethylamine in 1,500 g of deionized water, with stirring at a high speed, to obtain a viscous translucent product. The product was heated at 55° C under reduced pressure to remove the solvent. Thereto was added deionized water to effect concentration adjustment to obtain a translucent aqueous polyurethane resin (A-1) having a non-volatile content of 23.7%, a viscosity (BM viscometer, 60 rpm, 25° C.) of 23 cps and a pH of 8.4.

An aqueous polyurethane resin (A-2 to A-4) having the properties shown in Table 1 was prepared in the same manner as above, using the materials shown in Table 1.

TABLE 1

| Raw materials | (A) | | | |
|---|---|---|---|---|
|  | A-1 | A-2 | A-3 | A-4 |
| Polyester polyol solution (I) | 240 | 240 | 195 | 195 |
| Dimethylolpropionic acid | 30 | 30 | 20 | 20 |
| 1,6-hexanediol | — | — | 35 | 35 |
| Cyclohexanedimethanol | 27 | 27 | — | — |
| 4,4'-Dicyclohexylmethane diisocyanate | 236 | 236 | — | — |
| Isophoronediisocyanate | — | — | 200 | 200 |
| Triethylamine | 40 | 40 | 30 | 30 |
| 80% Aqueous hydrazine solution | 21 | — | 21 | — |
| Piperazine | — | 31 | — | 31 |
| Methyl ethyl ketone | 220 | 220 | 220 | 220 |
| Deionized water | 1500 | 1500 | 1250 | 1250 |
| Total | 2314 | 2324 | 1971 | 1981 |
| Non-volatile content (%) | 23.7 | 24.4 | 24.2 | 25.7 |
| Viscosity (60 rpm/25° C.) (cPs) | 23 | 600 | 9 | 18 |
| pH | 8.4 | 8.4 | 8.2 | 8.1 |
| Acid value | 47 | 47 | 38 | 38 |

PRODUCTION EXAMPLE 2

Production of aqueous dispersion B of acrylic copolymer

The following materials were prepared.

| Polymerizable monomers | |
|---|---|
| 2-Ethylhexyl acrylate | 265 g |
| Styrene | 165 g |
| Acrylonitrile | 50 g |

-continued

| | |
|---|---|
| Acrylic acid | 10 g |
| Diacetone acrylamide | 10 g |
| Surfactant | 50 g |

Newcol 707SF (special anionic emulsifier manufactured by Nihon Nyukazai, solid content: 30%)
Deionized water 360 g
Polymerization initiator 2.5 g
Ammonium persulfate Into a four-necked flask were fed 30 g of the above surfactant and 210 g of the above deionized water, and stirring was initiated. The mixture was heated to 80° C. in a nitrogen stream and the above polymerization initiator was added. Separately, 500 g of the above polymerizable monomers, 20 g of the above surfactant and 150 g of the above deionized water were mixed to prepare a monomer preemulsion. This preemulsion was dropped into the above flask in 3 hours. The reaction temperature was maintained at 80±3 ° C. After the completion of the dropping, the reaction was continued for further 2 hours with stirring by maintaining the same temperature. The reaction mixture was cooled and adjusted to pH 8-9 with 14% ammonia water to obtain an aqueous dispersion of an acrylic copolymer, having a non-volatile content of 55.1 a viscosity of 3.000 cPs and pH 8.5.

Aqueous dispersions (B-2) to (B-4) of acrylic copolymers having the properties shown in Table 2 were prepared in the same manner as above, using the materials shown in Table 2.

TABLE 2

| Raw materials | | (B) | | | |
|---|---|---|---|---|---|
| | | B-1 | B-2 | B-3 | B-4 |
| Polymerizable monomers | 2-Ethylhexyl acrylate | 265 | 265 | 265 | 265 |
| | Methyl methacrylate | — | — | 100 | 100 |
| | Styrene | 165 | 175 | 115 | 115 |
| | Acrylonitrile | 50 | 50 | — | — |
| | Acrylic acid | 10 | 10 | 10 | 10 |
| | Diacetone acrylamide | 10 | — | — | — |
| | N-methylolacrylamide | — | — | 10 | — |
| | Acrylamide | — | — | — | 10 |
| Surfactants | Newcol 707SF | 50 | 50 | 25 | 25 |
| | Emulgen 931*2 | — | — | 15 | 15 |
| Deionized water | | 360 | 360 | 380 | 380 |
| Polymerization initiator | Ammonium persulfate | 2.5 | 2.5 | 2.5 | 2.5 |
| Total | | 912.5 | 912.5 | 922.5 | 922.5 |
| Non-volatile content (%) | | 55.1 | 55.1 | 55.2 | 55.1 |
| Viscosity (60 rpm/25° C.) (cPs) | | 3000 | 2400 | 3400 | 3600 |
| pH | | 8.5 | 8.4 | 8.4 | 8.3 |

*2 A nonionic emulsifier (polyoxyethylene nonylphenyl ether), manufactured by KAO CORP.

Examples 1-6 and Comparative Examples 1-9

The aqueous polyurethane resins (A-1) and (A-4) obtained in Production Example 1 and the aqueous dispersions (B-1) to (B-4) of acrylic copolymers obtained in Production Example 2 were compounded as in Table 3-1 to prepare aqueous coating compositions of Examples 1-6 and Comparative Examples 1-9.

TABLE 3-1

| Compounding materials | (A) | | | | (B) | | | | weight ratio of solid content (A)/(B) | Non-volatile content (%) | Viscosity (60 rpm/ 25° C.) | pH |
|---|---|---|---|---|---|---|---|---|---|---|---|---|
| | A-1 | A-2 | A-3 | A-4 | B-1 | B-2 | B-3 | B-4 | | | | |
| Examples | | | | | | | | | | | | |
| 1 | 422 | | | | 91 | | | | 100/50 | 29.2 | 70 | 8.5 |
| 2 | 422 | | | | 181 | | | | 100/100 | 33.2 | 120 | 8.5 |
| 3 | 211 | | | | 181 | | | | 50/100 | 38.3 | 250 | 8.4 |
| 4 | 84 | | | | 181 | | | | 20/100 | 45.3 | 430 | 8.5 |
| 5 | | | 207 | | | | 181 | | 50/100 | 38.7 | 220 | 8.3 |
| 6 | | | 207 | | | | | 181 | 50/100 | 38.7 | 200 | 8.3 |
| Comparative Examples | | | | | | | | | | | | |
| 1 | 211 | | | | | 181 | | | 50/100 | 38.3 | 230 | 8.4 |
| 2 | | 205 | | | 181 | | | | 50/100 | 38.9 | 240 | 8.5 |
| 3 | | 205 | | | | 181 | | | 50/100 | 38.9 | 240 | 8.4 |
| 4 | | | | 195 | | | 181 | | 50/100 | 39.9 | 240 | 8.2 |
| 5 | | | | 195 | | | | 181 | 50/100 | 39.9 | 260 | 8.2 |
| 6 | 422 | | | | 5.4 | | | | 100/3 | 24.1 | 28 | 8.4 |
| 7 | 13 | | | | 181 | | | | 3/100 | 53.1 | 2800 | 8.5 |
| 8 | 422 | | | | | | | | 100/0 | 27.3 | 23 | 8.4 |
| 9 | | | | | 181 | | | | 0/100 | 55.1 | 3000 | 8.5 |

The following materials were prepared.

| Radical-polymerizable monomers | |
|---|---|
| 2-Ethylhexyl acrylate | 265 g |
| Styrene | 165 g |
| Acrylonitrile | 50 g |
| Acrylic Acid | 10 g |
| Diacetone acrylamide | 10 g |
| Surfactant | 50 g |
| Newcol 707SF (special anionic emulsifier manufactured by Nihon Nyukazai, solid content: 30%) | |
| Deionized water | 360 g |
| Polymerization initiator | 2.5 g |
| Ammonium persulfate | |

To a four-necked flask were fed 30 g of the above surfactant, 210 g of the above deionized water and 1.054 g of an aqueous polyurethane resin (A-1), and stirring was initiated. The mixture was heated to 80° C. in a nitrogen stream and the above polymerization initiator was added. Separately, 500 g of the above radical-polymerizable monomers, 20 g of the above surfactant and 150 g of the above deionized water were mixed to prepare a monomer preemulsion. This monomer preemulsion was dropped into the above flask in 3 hours. The reaction temperature was maintained at 80±3° C.

After the completion of the dropping, the reaction was continued for a further 2 hours with stirring while maintaining the same temperature. The reaction mixture was cooled and adjusted to pH 8-9 with a 14% ammonia water to obtain an aqueous coating composition of Example 7 having a non-volatile content of 38.0%, a viscosity of 200 cPs and pH 8.5.

Aqueous coating compositions of Examples 8-11 and Comparative Examples 10-14 were obtained in the same manner as in Example 7, using the materials shown in Table 3-2.

The results of Examples 7-11 and Comparative Examples 10-14 are shown in Table 3-2.

COMPARATIVE EXAMPLE 15

Emulsion polymerization was conducted in the same manner as in Example 7 except that the aqueous polyurethane resin (A-1) was not used, to obtain an acrylic copolymer emulsion.

The emulsion had a non-volatile content of 55.1%, a viscosity of 3.300 cPs and pH 8.5

COMPARATIVE EXAMPLE 16

The aqueous polyurethane resin (A-1) per se was used in this Comparative Example to examine the effect of its combination use with an acrylic polymer.

The aqueous coating compositions of Examples 7-11 and Comparative Examples 10-16 were tested for properties when made into a film by itself using no additive. The results are shown in Table 4.

TABLE 3-2

| | | Examples | | | | | Comparative Examples | | | | |
|---|---|---|---|---|---|---|---|---|---|---|---|
| | | 7 | 8 | 9 | 10 | 11 | 10 | 11 | 12 | 13 | 14 |
| (A) | A-1 | 1054 | 4219 | 211 | 1054 | 1054 | 1054 | | | 63 | 70323 |
| | A-2 | | | | | | | 1025 | 1025 | | |
| (C) | 2-Ethylhexyl acrylate | 265 | 265 | 265 | | | 265 | 265 | 265 | 265 | 265 |
| | Butyl acrylate | | | | 265 | 265 | | | | | |
| | Methyl methacrylate | | | | 100 | 100 | | | | | |
| | Styrene | 165 | 165 | 165 | 115 | 115 | 175 | 165 | 175 | 165 | 165 |
| | Acrylonitrile | 50 | 50 | 50 | | | 50 | 50 | 50 | 50 | 50 |
| | Acrylic acid | 10 | 10 | 10 | 5 | 5 | 10 | 10 | 10 | 10 | 10 |
| | Methacrylic acid | | | | 5 | 5 | | | | | |
| | Diacetone acrylamide | 10 | 10 | 10 | | | | 10 | | 10 | 10 |
| | Acrylamide | | | | 10 | | | | | | |
| | N-methylolacrylamide | | | | | 10 | | | | | |
| Surfactants | Newcol 707SF | 50 | 50 | 50 | | | | | | | |
| | Nyukol 707SF | | | | | | 50 | 50 | 50 | 50 | 50 |
| | Levenol WZ*2 | | | | 40 | 40 | | | | | |
| | Emulgen 931*3 | | | 10 | | | | | | | |
| | Noigen EA-170*4 | | | | 10 | 10 | | | | | |
| Deionized water | | 360 | 360 | 360 | 360 | 360 | 360 | 360 | 360 | 360 | 360 |
| Polymerization initiator | Potassium persulfate | | | | 2.5 | 2.5 | | | | | |
| | Ammonium persulfate | 2.5 | 2.5 | 2.5 | | | 2.5 | 2.5 | 2.5 | 2.5 | 2.5 |
| Non-volatile content (%) | | 38.0 | 30.1 | 49.0 | 38.1 | 38.2 | 38.1 | 38.2 | 38.0 | 53.1 | 24.0 |
| Viscosity (60 rpm/25° C.) (cPs) | | 200 | 50 | 850 | 520 | 420 | 220 | 180 | 150 | 2800 | 30 |
| pH | | 8.5 | 8.5 | 8.5 | 8.4 | 8.5 | 8.3 | 8.4 | 8.4 | 8.5 | 8.4 |

*2 An anionic emulsifier manufactured by KAO CORP.
*3 A nonionic emulsifier manufactured by KAO CORP.
*4 A nonionic emulsifier manufactured by Daiichi Kogyo Seiyaku Co., Ltd.

TABLE 4

Properties of aqueous coating compositions (Properties of clear films)

| | | | Examples | | | | | Comparative Examples | | | | | | |
|---|---|---|---|---|---|---|---|---|---|---|---|---|---|---|
| | | | 7 | 8 | 9 | 10 | 11 | 10 | 11 | 12 | 13 | 14 | 15 | 16 |
| (1) | Water resistance | | ○ | ○ | ○ | ○ | ○ | ○ | ○ | ○ | ○ | △ | ○ | △ |
| (2) | Alkali resistance | | ○ | ○ | ○ | ○ | ○ | ○ | ○ | ○ | ○ | △ | ○ | △ |
| (3) | Solvent resistance | Toluene | ○ | ○ | △ | ○ | ○ | X | X | X | X | ○ | X | ○ |
| | | Methyl ethyl ketone | ○ | ○ | △ | ○ | ○ | X | X | X | X | X | △ | X |
| (4) | Abrasion resistance | | ○ | ○ | △ | ○ | ○ | △ | △ | △ | △ | ○ | △ | ○ |
| (5) | Stress and Strain of coating film | Stress (kg/cm²) −20° C. | 290 | 520 | 205 | 272 | 305 | 262 | 232 | 222 | 150 | 520 | 122 | 490 |
| | | 20° C. | 136 | 420 | 56 | 133 | 142 | 76 | 68 | 48 | 12 | 475 | 8 | 390 |
| | | 60° C. | 92 | 260 | 42 | 96 | 105 | 25 | 30 | 18 | Impossible to measure*5 | 170 | Impossible to measure*5 | 160 |
| | | Strain (%) −20° C. | 250 | 120 | 280 | 262 | 250 | 0 | 0 | 0 | 280 | 0 | 280 | 0 |
| | | 20° C. | 260 | 135 | 390 | 280 | 270 | 450 | 425 | 640 | >1500 | 60 | >1500 | 60 |
| | | 60° C. | 280 | 150 | 470 | 310 | 290 | 200 | 215 | 260 | Impossible to measure*5 | 90 | Impossible to measure*5 | 80 |
| (6) | Flow-starting | | 148 | 168 | 130 | 148 | 150 | 108 | 109 | 108 | 83 | 108 | 83 | 109 |

TABLE 4-continued

| | Properties of aqueous coating compositions (Properties of clear films) | | | | | | | | | | |
|---|---|---|---|---|---|---|---|---|---|---|---|
| | Examples | | | | | Comparative Examples | | | | | |
| | 7 | 8 | 9 | 10 | 11 | 10 | 11 | 12 | 13 | 14 | 15 | 16 |
| temperature (°C.) | | | | | | | | | | | — |

*5 Measurement was impossible because the test piece was tacky at the measurement temperature.

Test methods

(1) Water resistance

A sample was coated on a glass plate by a 3-mil applicator and dried for 3 days at room temperature. The resulting coating film was immersed in water for 7 days at room temperature and then the film condition was examined visually. (○ indicates a good film condition; Δ indicates a normal film condition; and X indicates a poor film condition. These rating criteria also apply hereinafter.)

(2) Alkaline resistance

The coating film prepared in the same manner as in (1) above was immersed in a 2% aqueous NaOH solution for 7 days and then the film condition was examined visually.

(3) Solvent resistance

The coating film prepared in the same manner as in (1) above was immersed in methyl ethyl ketone for 1 day and then the film condition was examined visually.

(4) Abrasion resistance

A sample was coated on a standard tile (a vinyl-asbestos tile) for testing according to the JFPA specification, in an amount of 10±2 ml per m² of said tile. Coating was effected 5 times in the same manner. The resulting test piece was dried for 7 days at normal temperature and tested for extent of abrasion using a Taber machine (abrasion ring: CS-17, load: 1,000 g).

(5) Stress and strain of coating film

A sample was coated on a glass plate so that the resulting film had a thickness of 0.2 mm after drying, and then dried for 7 days.

(6) Flow-starting temperature

A sample was coated on a glass plate and dried for 7 days. 1.5-2.0 g of the resulting coating film was used and measured for flow-starting temperature (by using Koka flow Tester) under conditions of a temperature elevation speed of 3° C./min, a load of 30 kgf and a die of 1 mmφ × 1 mmℓ.

Test results

As is clear from Table 4, the aqueous coating compositions, as compared with other compositions not meeting the requirements of the present invention, are very superior in abrasion resistance, solvent resistance and stress and strain of coating film. Further, they have a far higher flow-starting temperature. Therefore, it is understood that the aqueous coating compositions of the present invention have a functional bond between aqueous urethane resin and acrylic resin.

Using the aqueous coating compositions obtained according to the compounding recipes shown in Table 3-2, elastic coating were prepared according to the following compounding recipes.

| | |
|---|---|
| Tipaque R-930*6 | 100.0 |
| Hi-Metholose 90SH-15000*7 | 0.6 |
| Primal 850*8 | 1.0 |
| 5% KTPP (potassium tripolyphosphate) | 2.0 |
| Noigen EA-120*9 | 1.0 |
| Adekanol SX-568*10 | 2.5 |
| Ethylene glycol | 10.0 |
| Water | 35.2 |
| 28% Ammonia water | 1.0 |

The above materials were dispersed by a high speed disperser. Then, the following materials were added thereto.

| | |
|---|---|
| 39% Emulsion of each aqueous coating composition*11 | 391.0 |
| Texanol | 26.4 |
| Xylene | 6.6 |
| Adekanol UH-420*12/water = ½ (To meet viscosity of coating.) | |
| Total | 577.3 |
| N.V (%) | 43.7 |
| PVC (%) | 15.2 |
| PWC (%) | 39.6 |

*6 Rutile titanium oxide manufactured by ISHIHARA SANGYO KAISHA, LTD.
*7 Methylcellulose manufactured by Shin-Etsu Chemical Co., Ltd.
*8 Polycarboxylic acid type dispersant manufactured by Rohm and Haas Co. of U.S.
*9 Surfactant manufactured by Daiichi Kogyo Seiyaku Co., Ltd.
*10 Defoamant manufactured by ASAHI DENKA KOGYO K.K.
*11 Adjusted based on the non-volatile content of each composition.
*12 Thickener manufactured by ASAHI DENKA KOGYO K.K.

Using the above compounding recipes, the aqueous coating compositions of Examples 7-11 and Comparative Examples 10-16 were made into respective coating films and the films were measured for properties. The results are shown in Table 5.

TABLE 5

Properties of aqueous coating compositions (Properties of coating films)

| | | Examples | | | | | Comparative Examples | | |
|---|---|---|---|---|---|---|---|---|---|
| | | 7 | 8 | 9 | 10 | 11 | 10 | 11 | 12 |
| Viscosity of coating | | 100.000 | 110.000 | 110.000 | 100.000 | 105.000 | 100.000 | 105.000 | 110.000 |
| Gloss of coating film | | 76 | 77 | 76 | 77 | 76 | 76 | 74 | 75 |
| Strain of coating film (%) | At 20° C. | 250 | 125 | 320 | 260 | 200 | 280 | 240 | 320 |
| | At −10° C. | 230 | 110 | 305 | 235 | 185 | 25 | 30 | 30 |
| | After immersion in water | 215 | 130 | 300 | 220 | 190 | 160 | 150 | 210 |
| | After heating | 200 | 100 | 310 | 210 | 180 | 160 | 150 | 215 |
| Deterioration when extended | | No | No | No | No | No | No | No | No |
| Strength of | At normal condition | 110 | 120 | 72 | 110 | 105 | 80 | 72 | 68 |

TABLE 5-continued

Properties of aqueous coating compositions
(Properties of coating films)

| | | | | | | | | | |
|---|---|---|---|---|---|---|---|---|---|
| adhesion (kg/cm²) | After immersion in water | 106 | 100 | 68 | 110 | 110 | 50 | 44 | 50 |
| Resistance to repeated hot-cold cycles | | Good | Good | Good | Good | Good | Partially peeled | Partially peeled | Partially peeled |
| Water permeability (ml) | | 0.2 | 0.1 | 0.1 | 0.2 | 0.2 | 0.8 | 0.8 | 1.0 |
| Impact resistance (500 g × 30 cm) | | Normal | Normal | Normal | Normal | Normal | Normal | Normal | Normal |
| Weather resistance | | Good | Good | Good | Good | Good | Slightly deteriorated | Slightly deteriorated | Slightly deteriorated |
| Stress of coating film | At 20° C. | 220 | 360 | 80 | 230 | 240 | 85 | 92 | 70 |
| | At −10° C. | 262 | 380 | 145 | 280 | 300 | 230 | 220 | 175 |
| | After immersion in water | 162 | 340 | 92 | 200 | 220 | 60 | 58 | 60 |
| | After heating | 200 | 300 | 90 | 210 | 240 | 120 | 110 | 100 |
| Accelerated weather registance | At 20° C. (%) | 220 | 115 | 280 | 230 | 185 | 228 | 240 | 170 |
| | At −10° C. (%) | 200 | 100 | 270 | 220 | 160 | 0 | 0 | 0 |

| | | Comparative Examples | | | |
|---|---|---|---|---|---|
| | | 13 | 14 | 15 | 16 |
| Viscosity of coating | | 105.000 | 100.000 | 100.000 | 105.000 |
| Gloss of coating film | | 76 | 74 | 75 | 74 |
| Strain of coating film (%) | At 20° C. | 240 | 30 | 250 | 30 |
| | At −10° C. | 45 | 0 | 30 | 0 |
| | After immersion in water | 220 | 0 | 230 | 0 |
| | After heating | 240 | 30 | 240 | 30 |
| Deterioration when extended | | No | No | No | No |
| Strength of adhesion (kg/cm²) | At normal condition | 25 | 100 | 20 | 120 |
| | After immersion in water | 20 | 90 | 18 | 80 |
| Resistance to repeated hot-cold cycles | | Partially peeled | Partially peeled | Partially peeled | Partially peeled |
| Water permeability (ml) | | 1.0 | 0.2 | 0.2 | 0.2 |
| Impact resistance (500 g × 30 cm) | | Normal | Poor | Normal | Poor |
| Weather resistance | | Good | Deteriorated | Good | Deteriorated |
| Stress of coating film | At 20° C. | 30 | 230 | 20 | 220 |
| | At −10° C. | 120 | 370 | 110 | 420 |
| | After immersion in water | 30 | 170 | 20 | 120 |
| | After heating | 45 | 360 | 55 | 420 |
| Accelerated weather registance | At 20° C. (%) | 260 | 0 | 290 | 0 |
| | At −10° C. (%) | 100 | 0 | 55 | 0 |

Test method

Viscosity of coating:

A coating was measured for viscosity (cPs) by a BH type viscometer (4 rpm). Gloss of coating film:

A coating was coated on a glass plate by a 3-mil applicator and dried for 1 day. The resulting film was measured for reflectance (%) of 60° /60°.

Strain (JIS A 6910):

A sample was prepared so that the coating film had a thickness of about 1 mm when dried. It was aged according to the JIS method for strain and subjected to punching by No. 2 dumbbell. The resulting piece was used as a test piece. (Coating→aging for 7 days→back side aging for 7 days→punching)

Deterioration when extended (JIS A 6910):

The above sample piece was subjected to punching by No. 1 dumbbell. The resulting piece was used as a test piece.

Strength of adhesion (JIS A 6910):

Acrydic 53-448 was coated as a primer and dried for 3 hours. Then, a sample was coated thereon according to the test method and aged for 14 days. The resulting material was used for testing. Incidentally, the test material used for adhesion strength after immersion in water had been coated at the four sides with a vinyl chloride resin coating, 3 days befoe the completion of the aging. The adhesive used was a two-pack type epoxy adhesive.

Resistance to repeated hot-cold cycles:

A cycle consisting of (18 hours in water of 20±2° C. →3 hours at −20±3° C. →3 hours at ±50±3° C.) was repeated 10 times (total 10 cycles).

Water permeability:

Measured according to the JIS test method for extensive types.

Impact resistance:

Measured according to the JIS test method for extensive types.

Weather resistance:

Measured according to the JIS test method for extensive types.

Stress of coating film:

The stress of coating film when strain by JIS A 6910 was measured, was recorded.

Accelerated weather resistance:

The same coating film as used in the measurement of strain was subjected to light exposure for 50 hours in a standard weatherometer and then measured for strain at 20° C. and −10° C.

Test results

As is clear from Table 5, the aqueous coating compositions of the present invention, also when compounded with a pigment, have good weather resistance and the strengths of the resulting coating films do not deteriorate even after immersion in water.

The aqueous coating compositions of Examples 1-6 and Comparative Examples 1-9 were made into films by themselves using no additive, and the films were measured for properties. The results ar shown in Table 6-1.

TABLE 6-1

Properties of aqueous coating compositions (Properties of clear films)

| | | | Examples | | | | | | Comparative Examples | | | | | | | |
|---|---|---|---|---|---|---|---|---|---|---|---|---|---|---|---|---|
| | | | 1 | 2 | 3 | 4 | 5 | 6 | 1 | 2 | 3 | 4 | 5 | 6 | 7 | 8 | 9 |
| (1) Water resistance | | | ○ | ○ | ○ | ○ | ○ | ○ | ○ | ○ | ○ | ○ | ○ | Δ | ○ | Δ | ○ |
| (2) Alkali resistance | | | ○ | ○ | ○ | ○ | ○ | ○ | ○ | ○ | ○ | ○ | ○ | X | ○ | X | ○ |
| (3) Solvent resistance | Toluene | | ○ | ○ | ○ | Δ | ○ | ○ | X | X | X | X | X | ○ | X | ○ | X |
| | Methyl ethyl ketone | | Δ | ○ | ○ | ○ | ○ | ○ | X | X | X | X | X | X | Δ | X | Δ |
| (4) Abrasion resistance | | | ○ | ○ | ○ | Δ | ○ | ○ | Δ | Δ | Δ | Δ | Δ | ○ | X | ○ | X |
| (5) Stress and strain of coating film | Stress (kg/cm²) | −20° C. | 472 | 380 | 272 | 243 | 286 | 280 | 262 | 222 | 272 | 274 | 272 | 470 | 146 | 492 | 142 |
| | | 20° C. | 352 | 262 | 136 | 76 | 156 | 152 | 62 | 46 | 76 | 82 | 66 | 220 | 12 | 378 | 12 |
| | | 60° C. | 186 | 142 | 86 | 48 | 102 | 92 | 22 | 12 | 33 | 24 | 18 | 86 | —*³ | 142 | —*³ |
| | Strain (%) | −20° C. | 120 | 212 | 242 | 240 | 225 | 260 | 0 | 0 | 0 | 0 | 0 | 0 | 260 | 0 | 280 |
| | | 20° C. | 142 | 220 | 263 | 446 | 246 | 282 | 450 | 640 | 406 | 425 | 402 | 60 | >1500 | 40 | >1500 |
| | | 60° C. | 163 | 240 | 280 | 450 | 270 | 298 | 220 | 280 | 202 | 215 | 192 | 80 | —*³ | 160 | —*³ |
| (6) Flow-starting temperature (°C.) | | | 168 | 162 | 147 | 130 | 148 | 146 | 108 | 107 | 106 | 107 | 108 | 108 | 83 | 109 | 83 |

*³Measurement was impossible because the test piece was tacky at the measurement temperature.

Test results

As is clear from Table 6-1, the aqueous coating compositions of the present invention, even when no pigment is compounded, have good weather resistance, and the strengths of the resulting coating films do not deteriorate even after immersion in water.

Using the aqueous coating compositions of Examples 1-6 and Comparative Examples 1-9, elastic coatings were prepared according to said compounding recipes. The respective coating films were measured for properties. The results are shown in Table 6-2.

TABLE 6-2

Properties of aqueous coating compositions (Properties of coating films)

| | | Examples | | | | | | Comparative Examples | |
|---|---|---|---|---|---|---|---|---|---|
| | | 1 | 2 | 3 | 4 | 5 | 6 | 1 | 2 |
| Viscosity of coating | | 110.000 | 115.000 | 110.000 | 120.000 | 130.000 | 110.000 | 120.000 | 115.000 |
| Gloss of coating film | | 78 | 76 | 78 | 79 | 76 | 77 | 76 | 74 |
| Strain of coating film (%) | At 20° C. | 122 | 205 | 242 | 365 | 222 | 252 | 280 | 320 |
| | At −20° C. | 110 | 200 | 222 | 305 | 202 | 226 | 25 | 30 |
| | After immersion in water | 120 | 186 | 206 | 306 | 186 | 212 | 156 | 206 |
| | After heating | 120 | 180 | 210 | 312 | 180 | 206 | 166 | 225 |
| Deterioration when extended | | No | No | No | No | No | No | No | No |
| Strength of adhesion (kg/cm²) | At normal condition | 120 | 110 | 96 | 72 | 100 | 112 | 70 | 66 |
| | After immersion in water | 110 | 106 | 96 | 68 | 98 | 106 | 42 | 35 |
| Resistance to repeated hot-cold cycles | | Good | Good | Good | Good | Good | Good | Partially peeled | Partially peeled |
| Water permeability (ml) | | 0.1 | 0.2 | 0.2 | 0.2 | 0.2 | 0.2 | 0.8 | 1.0 |
| Impact resistance (500 g/30 cm) | | Normal | Normal | Normal | Normal | Normal | Normal | Normal | Normal |
| Weather resistance | | Good | Good | Good | Good | Good | Good | Slightly deteriorated | Slightly deteriorated |
| Stress of coating film | At 20° C. | 340 | 286 | 156 | 96 | 160 | 178 | 85 | 68 |
| | At −10° C. | 421 | 365 | 242 | 188 | 238 | 256 | 220 | 165 |
| | After immersion in water | 324 | 280 | 154 | 106 | 166 | 188 | 52 | 42 |
| | After heating | 366 | 292 | 168 | 104 | 172 | 190 | 108 | 105 |
| Accelerated weather registance | At 20° C. (%) | 105 | 188 | 220 | 340 | 202 | 222 | 224 | 288 |
| | At −10° C. (%) | 90 | 170 | 212 | 282 | 176 | 206 | 0 | 0 |

| | Comparative Examples | | | | | | |
|---|---|---|---|---|---|---|---|
| | 3 | 4 | 5 | 6 | 7 | 8 | 9 |
| Viscosity of coating | 110.000 | 120.000 | 115.000 | 115.000 | 110.000 | 115.000 | 110.000 |
| Gloss of coating film | 74 | 75 | 74 | 76 | 77 | 75 | 77 |

TABLE 6-2-continued

| | | Properties of aqueous coating compositions (Properties of coating films) | | | | | | |
|---|---|---|---|---|---|---|---|---|
| Strain of | At 20° C. | 185 | 192 | 180 | 20 | 250 | 20 | 260 |
| coating | At −20° C. | 20 | 20 | 20 | 0 | 38 | 0 | 40 |
| film (%) | After immersion in water | 122 | 141 | 130 | 0 | 220 | 0 | 230 |
| | After heating | 142 | 142 | 125 | 60 | 230 | 80 | 235 |
| Deterioration when extended | | No | No | No | No | No | No | No |
| Strength of adhesion (kg/cm$^2$) | At normal condition | 72 | 76 | 66 | 120 | 16 | 130 | 18 |
| | After immersion in water | 44 | 44 | 38 | 60 | 16 | 72 | 16 |
| Resistance to repeated hot-cold cycles | | Partially peeled | Partially peeled | Partially peeled | Partially peeled | Partially peeled | Partially peeled | Partially peeled |
| Water permeability (ml) | | 0.8 | 0.8 | 1.0 | 0.2 | 0.2 | 0.2 | 0.2 |
| Impact resistance (500 g/30 cm) | | Normal | Normal | Normal | Poor | Normal | Poor | Normal |
| Weather resistance | | Slightly deteriorated | Slightly deteriorated | Slightly deteriorated | Deteriorated | Good | Deteriorated | Good |
| Stress | At 20° C. | 85 | 92 | 78 | 180 | 18 | 206 | 18 |
| of | At −10° C. | 208 | 202 | 210 | 320 | 78 | 392 | 105 |
| coating film | After immersion in water | 52 | 66 | 51 | 120 | 16 | 102 | 16 |
| | After heating | 121 | 162 | 142 | 360 | 36 | 410 | 42 |
| Accelerated weather registance | At 20° C. (%) | 170 | 166 | 172 | 0 | 220 | 0 | 245 |
| | At −10° C. (%) | 0 | 0 | 0 | 0 | 25 | 0 | 30 |

Test results

As is clear from Table 6-2, the aqueous coating compositions of the present invention, also when compounded with a pigment, have good weather resistance and the strengths of the resulting coating films do not deteriorate even after immersion in water.

We claim:

1. An aqueous coating composition comprising, as essential components, an aqueous polyurethane resin (A) obtained by reacting a diisocyanate and glycols containing a carboxylic acid group-containing glycol to prepare a urethane prepolymer, neutralizing the urethane prepolymer and subjecting the neutralizing the urethane prepolymer and subjecting the neutralized urethane prepolymer to chain extension with a hydrazine derivative, and an aqueous dispersion (B) of an acrylic copolymer whose constituent monomers contain a carbonyl group-containing monomer or an amido group-containing monomer in an amount of at least 0.5 part by weight per 100 parts by weight of total polymerizable monomers, wherein the weight ratio in terms of solid content, of the aqueous polyurethane resin (A) and the aqueous dispersion (B) of an acrylic copolymer is 100/5 to 5/100, whereby when a film is obtained by coating the composition on a substrate and the coating allowed to dry a bond forms between the hydrazine terminal groups of the polyurethane resin and the carbonyl group or amido group of the acrylic copolymer, thereby forming a film of improved solvent resistance while retaining the properties of the polyurethane resin and the acrylic copolymer.

2. An aqueous coating composition obtained by polymerizing radical-polymerizable acrylic monomers (C) containing a carbonyl group-containing monomer or an amido group-containing monomer in an amount of at least 0.5 part by weight per 100 parts by weight of total polymerizable monomers, in the presence of an aqueous polyurethane resin (A) obtained by reacting a diisocyanate and glycols containing a carboxylic acid group-containing glycol to prepare a urethane prepolymer, neutralizing the urethane prepolymer and subjecting the neutralized urethane prepolymer to chain extension with a hydrazine derivative, in such proportions that the weight ratio in terms of solid content, of the aqueous polyurethane resin (A) and the radical-polymerizable acrylic monomers (C) is 100/5 to 5/100 whereby, when a film is obtained by coating said composition on a substrate and the coating allowed to dry a bond forms between the acrylic monomers (C) and the hydrazine terminal groups of the polyurethane resin thereby forming a film of improved solvent resistance which retains the properties of the polyurethane resin and the acrylic resin.

3. The aqueous coating composition of claim 1, wherein the aqueous polyurethane resin (A) is obtained by reacting a diisocyanate and glycols containing, as essential components, a carboxylic acid group-containing glycol and a polyester polyol.

4. The aqueous coating composition of claim 1 or 2, wherein the hydrazine derivative is at least one compound selected from the group consisting of hydrazine, ethylene-1,2-dihydrazine, propylene-1,3-dihydrazine and butylene-1,4-dihydrazine.

5. The aqueous coating composition of claim 1 or 2, wherein the carbonyl group-containing monomer is used and is at least one compound selected from the group consisting of acrolein, diacetone acrylamide, vinyl methyl ketone, vinyl ethyl ketone, vinyl butyl ketone, diacetone acrylate and acetonitrile acrylate.

6. The aqueous coating composition of claim 1 or 2, wherein the amido group-containing monomer is used and is at least one compound selected from the group consisting of acrylamide, methacrylamide, itaconic acid monoamide, itaconic acid diamide, maleic acid monoamide, maleic acid diamide, N-methylacrylamide, N-isobutylacrylamide, N-methylmethacrylamide, N-methylolacrylamide, N-ethoxymethylacrylamide, N-n- butoxymethylacrylamide and N-isopropoxymethacrylamide.

7. The aqueous coating composition of claims 1 or 2, wherein the aqueous polyurethane resin (A) has an acid value of 10-200 per resin (A) solid content.

8. The aqueous coating composition of claim 1 or 2 wherein the carbonyl group-containing monomer, amido group-containing monomer, or mixture thereof is used in an amount of 1.0-10.0 parts by weight per 100 parts by weight of total polymerizable monomers.

9. The composition of claim 1 wherein the weight ratio, in terms of solid content, of the aqueous polyurethane resin and the aqueous dispersion of the acrylic copolymer is from 100/10 to 10/100.

10. The composition of claim 2 wherein the weight ratio in terms of solid content, of the aqueous polyurethane resin and the radical-polymrizable acrylic monomers is from 100/10 to 10/100.

* * * * *